Patented Feb. 14, 1939

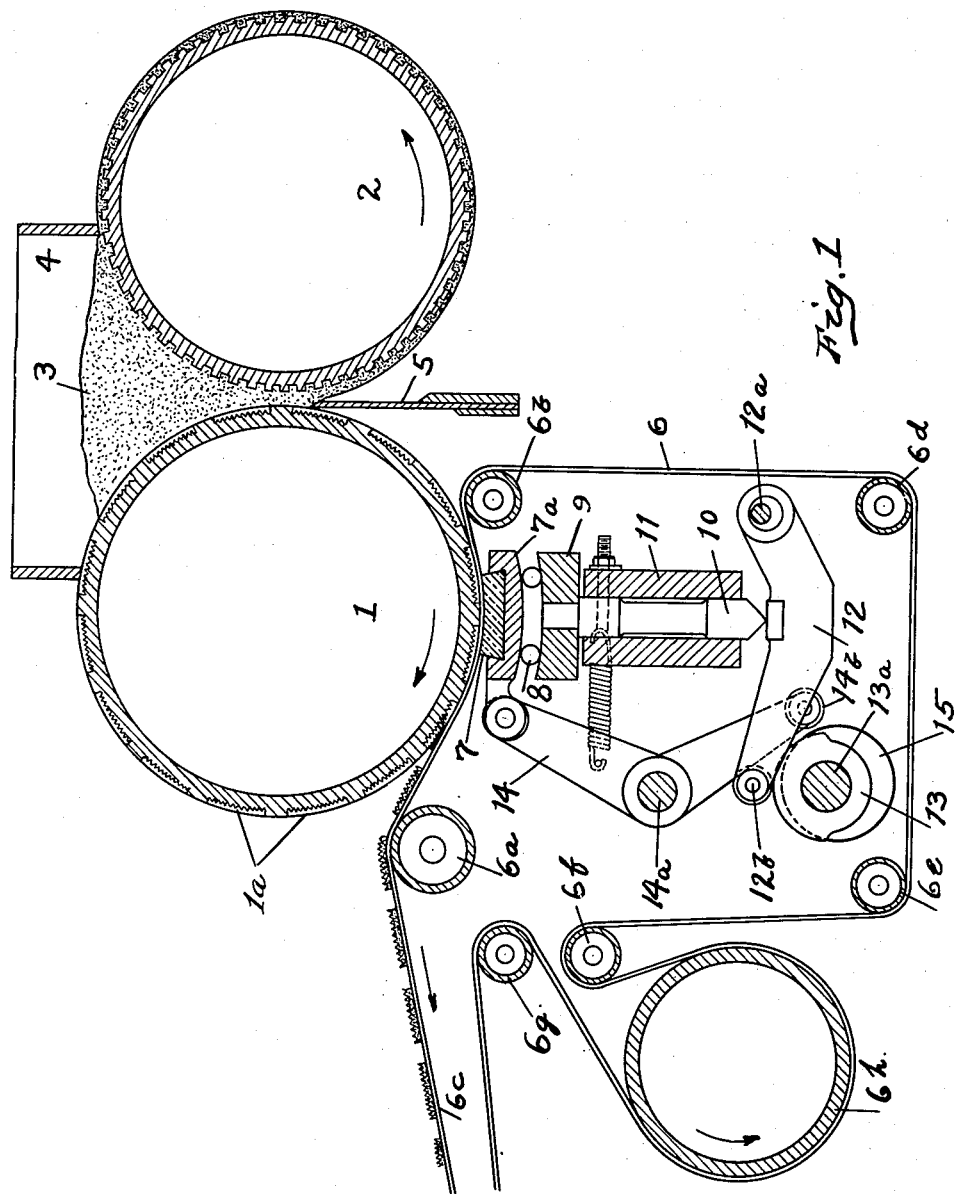

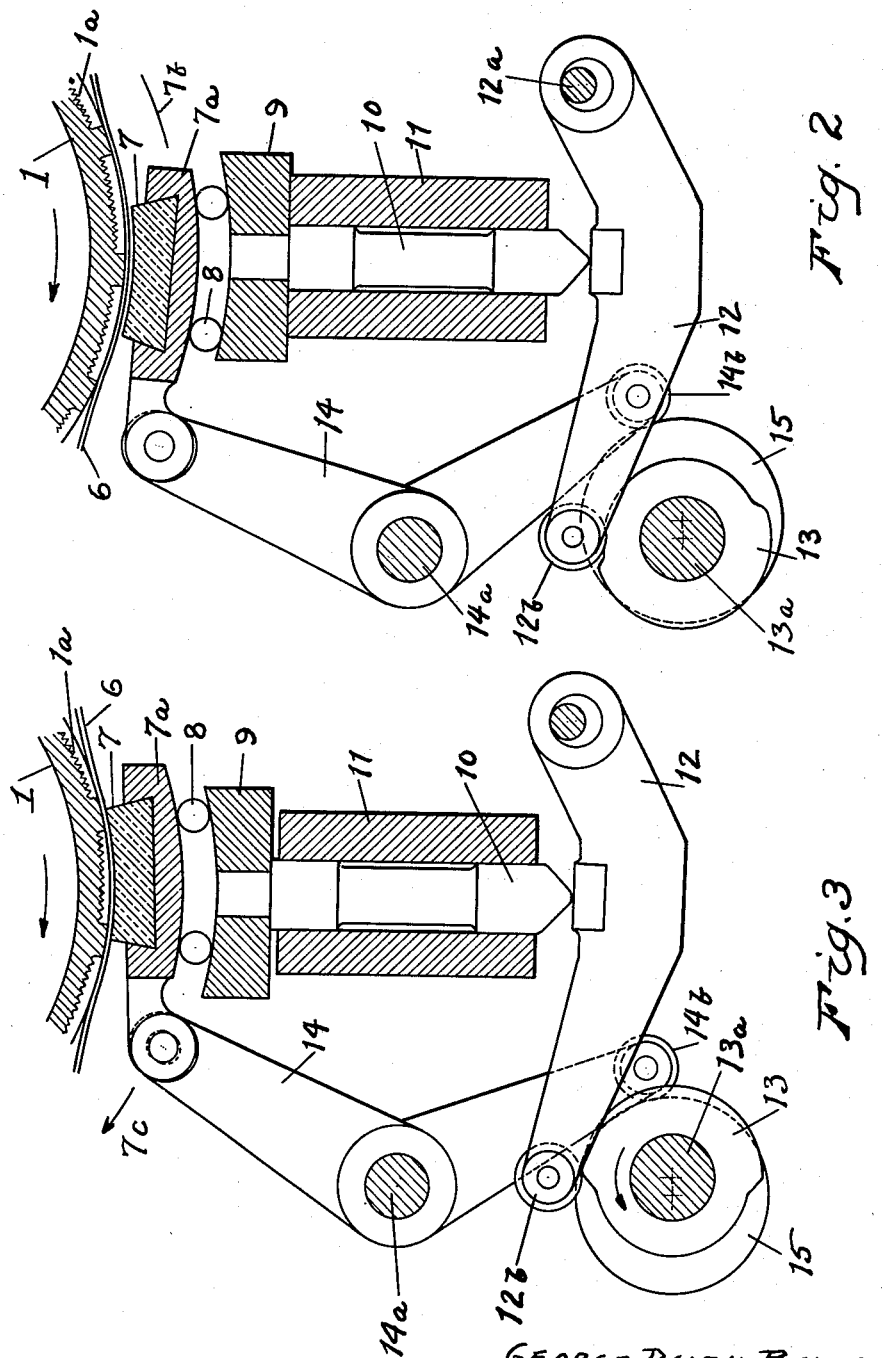

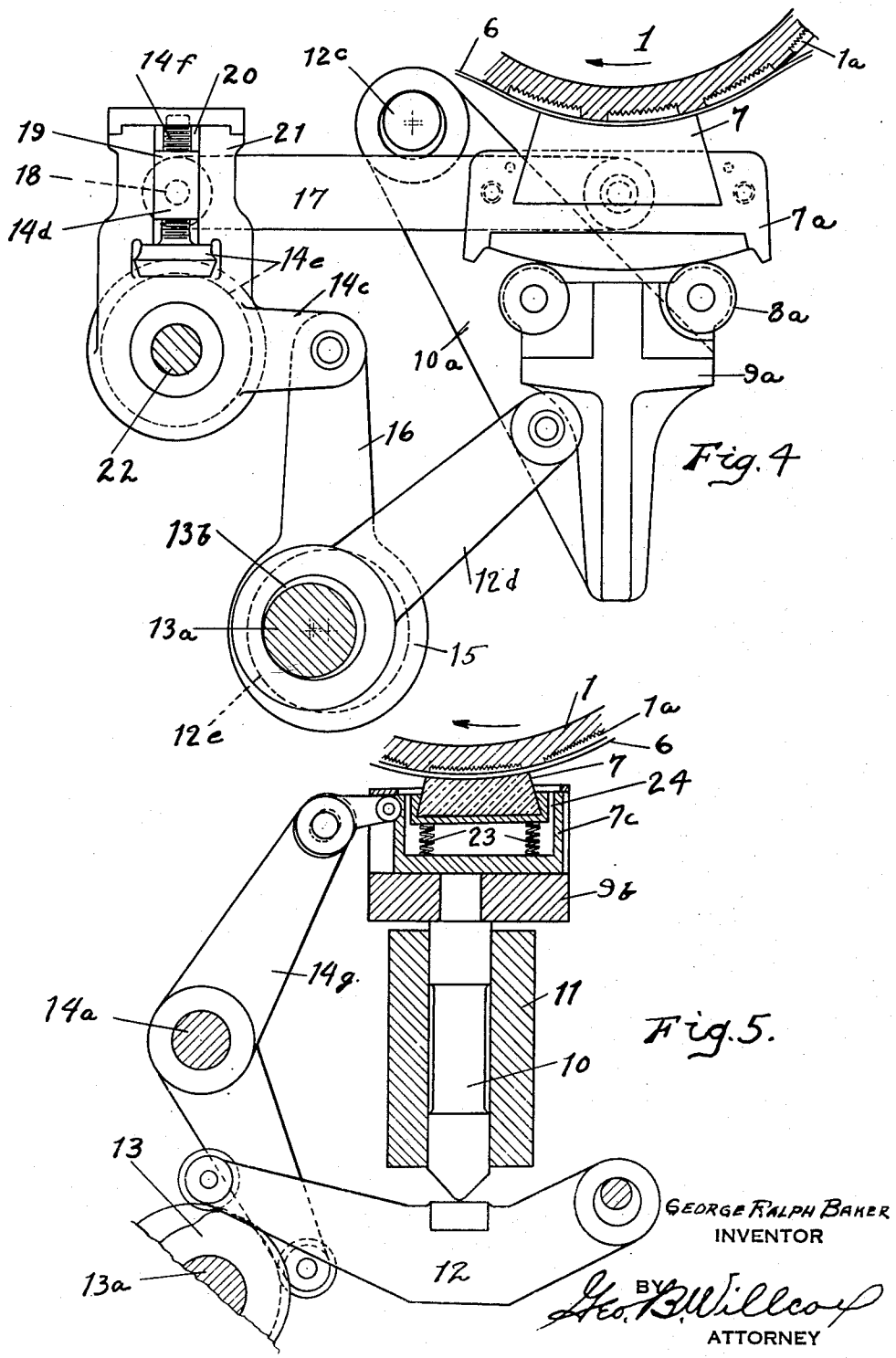

2,146,786

UNITED STATES PATENT OFFICE 2,146,786

ROTARY MOLDING MACHINE FOR BISCUIT DOUGH AND THE LIKE

George Ralph Baker, Peterborough, England, assignor to Baker Perkins Company, Inc., Saginaw, Mich., a corporation of New York Application September 25, 1936, Serial No. 102,564
In Great Britain September 27, 1935

5 Claims.  (Cl. 107—8)

This invention relates to rotary molding machines for biscuit doughs and the like and is more particularly applicable to molding machines of the type wherein the die roller travels in contact with an endless discharge apron or conveyor over an arc of the circumference of the roller.

The object of the present invention is to provide improvements whereby the regular discharge of the dough shapes from the dies or mold is assured irrespective of the kind of dough under treatment.

The reliable extraction of the dough pieces in machines of this kind is dependent upon the adhesion of the dough to the delivery apron at the discharge position, and an aim of the invention is to provide means whereby the adhesion between the dough shapes and the apron is controlled by increasing the pressure of the apron and exerting it uniformly over the dough pieces.

It is also an object of the invention to provide means whereby the characteristics of the molds or dies may be sharply impressed or embossed upon the dough pieces.

The invention consists in the provision of means adapted to bring surface pressure to bear through the apron upon an area of dough in the dies of the roller.

The invention also comprises the provision in a rotary dough molding machine having a pair of rollers supporting an apron in arcuate contact with the die roller, of pressure means adapted to operate intermittently upon the dough in the dies through that part of the apron lying between the pair of apron supporting rollers.

The invention further consists in the provision of means for moving a surface contact device or pad towards and away from the cylindrical working face of the die roller to move the pad into and out of circumferential contact therewith so as to impart punches or pressure contacts to the dough in the dies while the die roller revolves.

The invention may be applied to dough molding machines in which the discharge apron or conveyor is in contact with the die roller through a suitable angle to act upon the dough in the manner herein described. The rollers supporting the apron in such arcuate contact may or may not contact or press upon the die roller through the apron, depending on the kind of dough being worked.

According to the invention the surface contact device may be in the form of a pad of rubber, cork, felt or like material, or it may be of metal.

Further features of the invention will be hereinafter described or pointed out in the claims.

In the accompanying drawings:

Fig. 1 is a side elevation partly in section of part of a rotary dough molding machine of the type just referred to, showing an application of the invention.

Figs. 2 and 3 are fragmentary side elevations of portions of the mechanism shown in Fig. 1 illustrating its different operative positions.

Fig. 4 is a fragmentary side elevation showing the invention in a modified form.

Fig. 5 is a similar view of a still further modified form.

The invention will now be described with reference to Fig. 1.

A rotary dough molding machine has the usual die roller 1, and dough feeding roller 2, operating with the dough 3 supplied from the hopper 4. The dough severing knife 5 operates in conjunction with the die roller 1 and the apron 6 is supported on rollers 6a, 6b and contacts with and embraces the die roller 1 through an arc of its circumference. The usual guide rolls 6d to 6g, and a driving roller 6h are provided for the delivery lap 6c of the apron which travels, in the direction indicated by the arrow, to a blade or roller (not shown).

In carrying the invention into effect according to one convenient mode (see Figs. 1, 2 and 3), surface pressure means in the form of a pad 7, mounted in, or integral with a carriage 7a, is located beneath the bight of the apron lying between the supporting rollers 6a and 6b. The carriage 7a has an arcuate or concave underside which rests on roller bearings 8 supported upon a concave bed 9, for the purpose of guiding the carriage in an arc corresponding with that of the circumference of the die roller 1. The pad 7 is of sufficient width to cover a substantial arc of the circumference of the die roller and it extends longitudinally from side to side of the roller. Similarly, the carriage 7a and bed 9 extend axially or from side to side of the die roller. The bed 9 is mounted upon plunger 10. A plunger 10 is provided at each side of the machine, being slidable in a support 11. Under each plunger 10 is a lever 12 mounted at one end on an adjustable eccentric pivot 12a and having a roller 12b at the other end. Each roller 12b engages and is supported upon a cam 13 fixed on a shaft 13a driven by gearing from any suitable source. For example, the shaft may be driven from the usual die roller driving gear, not shown. The cams 13 are adapted to oscillate the levers 12 and reciprocate the plungers 10 to move the pad 7 towards and away from the die roller periodically so as to bring pressure to bear upon the dough in the dies.

In addition to being reciprocated in a direction radially of the die roller the pad 7 is displaced, substantially circumferentially of the die roller, by being traversed to and fro on the rollers 8.

According to one convenient mode of thus traversing the carriage 7a, the latter is connected to spring-returned bell-cranks 14 mounted on a fixed pivot 14a and carrying at their lower ends rollers 14b which contact with eccentrics 15 carried by the shaft 13a.

As the eccentrics 15 revolve, the carriage 7a is oscillated to and fro on the bed 9 so that as a result of this motion combined with that imparted to the pad by the cams 13, the pad 7 is moved into pressure contact with the apron and for a period it travels coincidentally with the apron. The pad recedes from the apron and then returns for again delivering a punch or pressure contact against the apron, so that the dough pieces while in the mold cavities 1a of the die roller 1 will be caused to adhere to the apron.

The above described initial position of pad 7 is shown in Fig. 2 and the return or punching position just referred to is shown in Fig. 3.

The width, or dimension of the pad 7 circumferentially of the die roller, may be such as to be capable of covering the largest dies 1a to be employed but it is not necessary that the pad 7 should register and exactly synchronize with the passage of the dies 1a, for it is sufficient if the pressure strokes of the pad are numerous enough to ensure that all portions of the dough in the die cavities receive in their travel at least one punching or pressure contact, while the number of pressure contacts made may be such that the dough in each die receives a series of overlapping pressure contacts.

In Fig. 1 the cams and mechanism are shown in the position in which the pad 7 is at the upper limit of its pressure stroke and is being drawn forwardly, or in the same direction of travel as the apron, by the movement imparted to it by the eccentrics 15, while in Fig. 2 the same parts are shown when the rollers 12b have just descended on their cams 13 and the pad 7 is in its low position, out of contact with the apron 6 and moving in a direction counter to that of the apron as indicated by the arrow 7b.

In Fig. 3 the rollers 12b are being raised by the cams 13 and the pad 7 is just making contact with the apron, while the eccentrics 15 are starting to impart a forward movement to the pad carriage 7a in the direction of the arrow 7c. This is done through the action of bell-crank levers 14.

It will be noted that in Fig. 3, as compared with Fig. 1, the die cavities 1a of the roller 1 have moved around in relation to the pad so that the pad 7 practically registers with a row of the die cavities 1a; whereas in Figs. 1 and 2 the pad is seen as bridging a pair of rows of die cavities.

According to a modification of the operative mechanism, shown in Fig. 4, the pad 7 is of somewhat larger circumferential extent. Its carriage with the arcuate underside is supported on spaced pivoted rollers 8a mounted on a cross-bar 9a supported in a pair of arms 10a. These arms are carried by adjustable eccentric pivots 12c and the bar 9a is oscillated about the pivotal axis of the arms to give the required vertical displacements to the pad 7 by connecting rod means 12d having eccentric sheaves 12e mounted on the eccentrics 13b which are carried by the rotatable shaft 13a. Circumferential movements are imparted to pad 7 by eccentrics 15 fixed to the shaft 13a through the eccentric sheaves and connecting rods 16, bell-crank levers 14c and bars 17 of the carriage 7a. The bell-cranks 14c are preferably joined to the bars 17 by adjustable connections 14d so that the stroke of the carriage 7a may be varied by turning a hand wheel (not shown) which may be located at one side of the machine, so as to cause the rotation of the bevel gears 14e.

The connection 14d consists of a wrist pin 18 on one side of a block 19 which is adjustably slidable in an upright slot 20 in a frame 21. This frame carries the bevel gears 14e. One of the bevel gears has an upright threaded shank 14f which is screwed into a threaded hole in the slidable block 19. Turning the bevel gears 14c by means of shaft 22 will raise or lower the wrist pin 18 and thus alter the extend of longitudinal reciprocation of bar 17 and pad 7.

It will be seen that according to the mechanism shown in Fig. 4 where eccentrics are used for both the up and down movements and the circumferential movement of the pad, that the pressure contact will be more gradually applied than where a cam, such as illustrated in Figs. 1, 2 and 3, is used. A cam may be employed for producing both the punching and the circumferential movements of the pad 7, or eccentrics may be employed; or an eccentric may be employed for one movement and a cam for the other.

Where eccentric means are employed for the circumferential movement it will be appreciated that as the pad makes contact with the apron it will be more gradually accelerated to the speed thereof than where a cam design is employed. Similarly, the pad will be more slowly retarded as it is leaving the apron; but it has been found that an eccentric movement is adequate and in the cases of certain doughs this slowing of the action at the commencement and end of the strokes may possess advantages. It is of advantage with certain types of dough to provide a slight relative movement between die roller and pad, and the eccentric will provide such movement.

It will be appreciated that according to the invention pressure is brought to bear upon a substantial area of the die roller simultaneously. This is in contradistinction to the progressive line contact which has hitherto been effected by the use of the known pressure and like rollers over which the apron passed and by which the apron was pressed against the die rollers. The line contact of such earlier pressure roller had the tendency, particularly where doughs rich in fat are used, to produce a wave throughout the dough which was likely to express the dough at the margins of the die; whereas the punches or pressure contacts of the pad device 7, provided by this invention, acting over a greater dough area, produce an embossing action on the dough and also avoid the extrusion thereof at the sides of the die.

In both examples so far described it is preferred to move the pad during the major portion of its circumferential contact with the apron, at substantially the same peripheral speed as that of the apron.

Although it is preferred to guide the pad or pressure means in an arcuate path when moving with the die roller, yet the alternative of resiliently mounting the pad or its carriage may be employed as shown at 23 in Fig. 5. In this case the carriage may be given a displacement parallel to a tangent to the roller. The resilient mounting of the pad 7 causes it to be pressed against the die roller 1 through the apron 6 as the carriage 7c is raised. This pressure reaches its maximum as the pad presses below the axis of the die roller.

The pad mounting consists of compressible springs 23 between the carriage 7c and the pad 7. The pad 7 is permitted a slight free movement, because of a clearance space 24 between it and the wall of the carriage. When the carriage is given a horizontal movement by means of links 14g and cam 13, the pad 7 may not completely follow such movement. It is at the same time being pushed up against the band 6. The pad 7 may thus have a slight tilting movement so it can remain in proper contact with the band during the horizontal travel of the pad. To load the springs and produce the desired punch provision, I provide the same cam and lever as in mechanisms previously described and illustrated in Figs. 1, 2, and 3.

Having thus described my invention, what I claim and desire to secure by Letters Patent is:

1. In a machine for molding dough or the like having a die roller and an apron supported in arcuate contact with said roller, in combination, a pressure pad having an arcuate face to conform to the surface of said die roller and apron, a carriage for said pad having an arcuate underside, an arcuate bed upon which said carriage is slidably mounted, means for moving said carriage radially toward said die roller, and means for moving said pad over said bed in a path concentric with said roller.

2. In a machine as claimed in claim 1, spaced bearing rollers between said carriage and pad.

3. In a machine for molding dough or the like having a die roller and an apron supported in enveloping contact with said roller, in combination, a movable pressure pad and means operable synchronously with the rotation of the roller to displace said pad toward and away from said roller to engage the apron and impart punching pressures to dough in the dies of said roller.

4. Apparatus as claimed in claim 3 in which means is provided to give said pad a movement with and circumferentially of said roller when the pad is in contact with the apron.

5. In a machine for molding dough or the like having a die roller and an apron supported in enveloping contact with said roller, in combination, a movable pressure pad shaped to conform to the arcuate surface of the die roller and apron, and actuating means operable synchronously with the rotation of said roller to move said pad toward said apron and roller to engage the apron and impart a punching pressure to the dough in a die of the roller, to move said pad concentrically to and with said roller in the direction of its rotation to impart static pressure to said dough, and to return the pad to its first position for another operating cycle.

GEORGE RALPH BAKER.